E. S. STACK.
REMOTE CONTROL MEANS FOR WATER HEATERS.
APPLICATION FILED JUNE 4, 1913.
1,234,949.
Patented July 31, 1917.
3 SHEETS—SHEET 1.
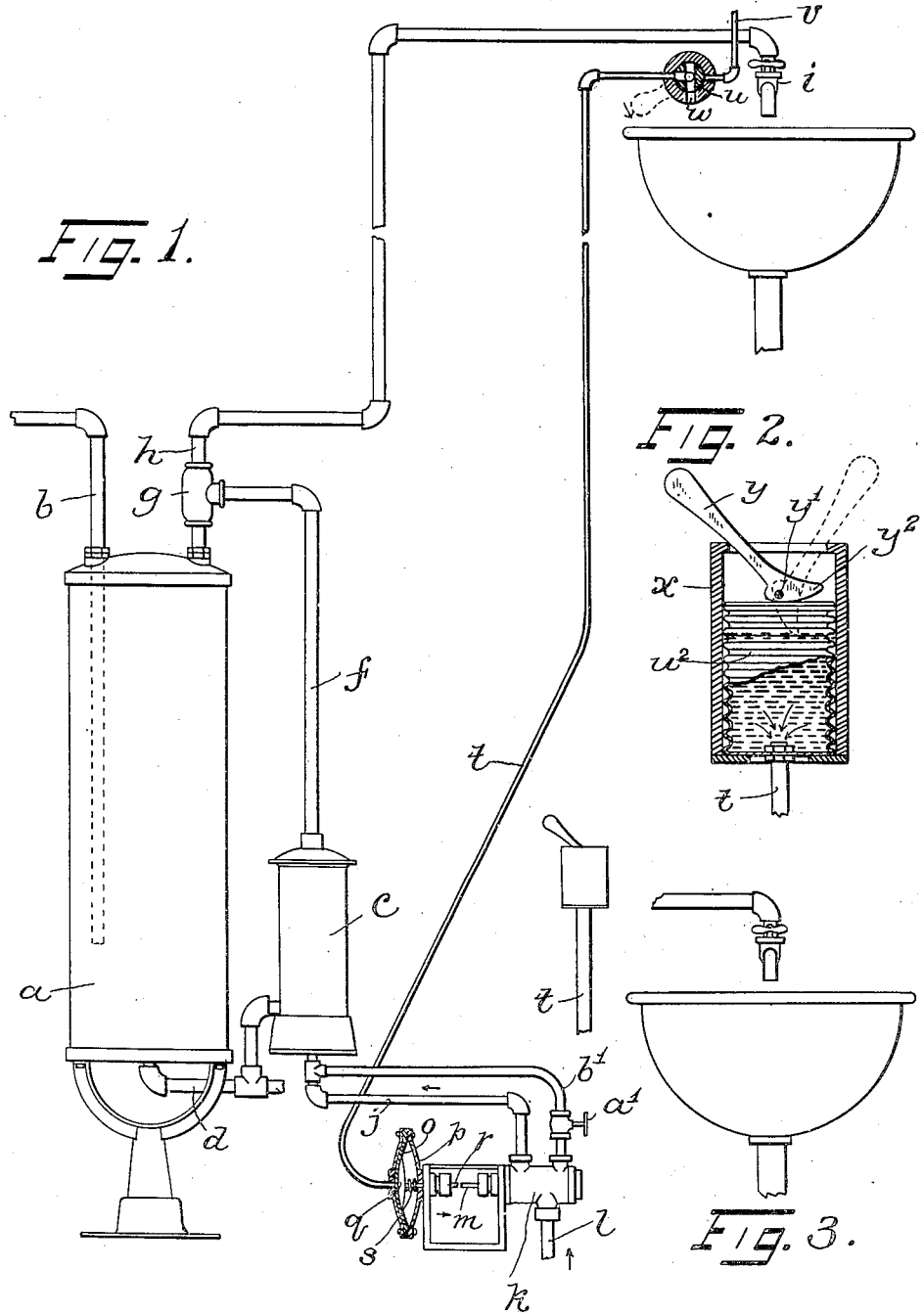

E. S. STACK.
REMOTE CONTROL MEANS FOR WATER HEATERS.
APPLICATION FILED JUNE 4, 1913.

1,234,949.

Patented July 31, 1917.
3 SHEETS—SHEET 2.

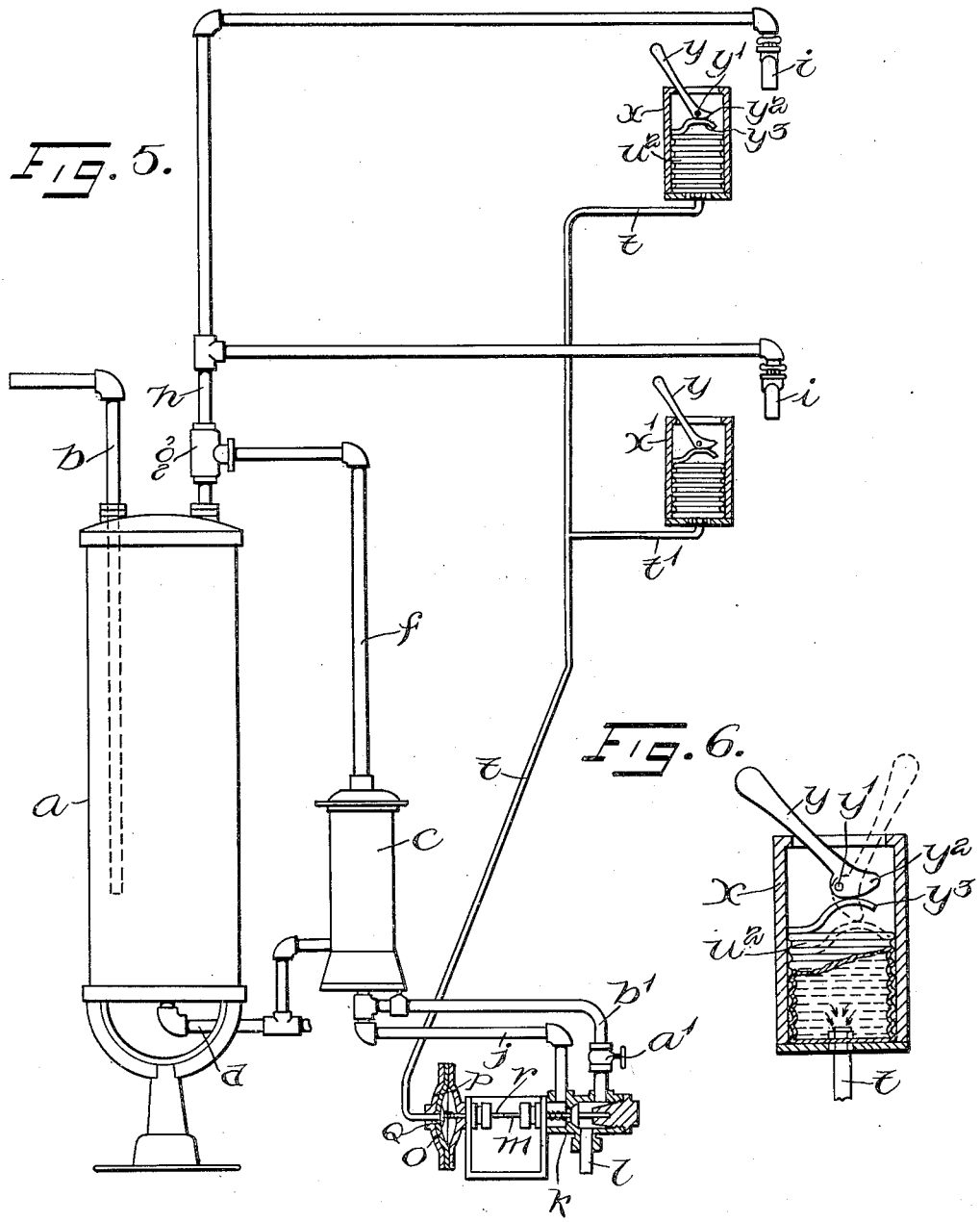

UNITED STATES PATENT OFFICE.

ELMER S. STACK, OF WEST SOMERVILLE, MASSACHUSETTS.

REMOTE CONTROL MEANS FOR WATER-HEATERS.

1,234,949.  Specification of Letters Patent.  Patented July 31, 1917.

Application filed June 14, 1913. Serial No. 771,665.

*To all whom it may concern:*

Be it known that I, ELMER S. STACK, a citizen of the United States, and resident of West Somerville, in the county of Middlesex and State of Massachusetts, have invented certain new and useful Improvements in Remote Control Means for Water-Heaters, of which the following is a specification.

The present invention relates to water heating systems particularly adapted to domestic use, and to that type of heating systems in which the heat is furnished by a gas flame. The object of the invention, briefly stated, is to provide an efficient and at the same time simple means by which the gas supply for the heater may be opened and closed by manipulation of a controller at the point where hot water is desired. In other words, the object of the invention is to enable one who desires to obtain hot water in a bath room, laundry or elsewhere, remote from the heater to turn up the flame or vice versa without being obliged to go to the heater. The object is not to provide an automatic heater, but to provide a distant control means by which the flame at the heater may be turned up or down when hot water is required, while the manipulator remains at the place where the water is drawn.

The invention is capable of being embodied in many different forms. In the preferred form the transmission of power from the distant controller is accomplished by a column of water, and this is the mode of transmission which I have illustrated in the present application. Various forms of controlling device may be used for making the transmission means active and inactive, and in this specification I describe and illustrate two such devices.

In the drawings forming a part of this application, Figure 1 is a view partly in elevation and partly diagrammatic of a hot water system, a gas heater and a means provided with a distant controller for regulating the flame of the heater.

Fig. 2 is a detailed sectional view of a controller alternative to that shown in Fig. 1.

Fig. 3 is a view similar to a portion of Fig. 2, showing the mode of applying the controller which is illustrated in detail in Fig. 2.

Fig. 5 is a similar view showing a simplified means for obtaining the same effect.

Fig. 6 is a sectional view similar to Fig. 2 showing a modification of the controller illustrated in Fig. 1.

The same reference characters indicate the same parts in all the figures.

Figure 4:
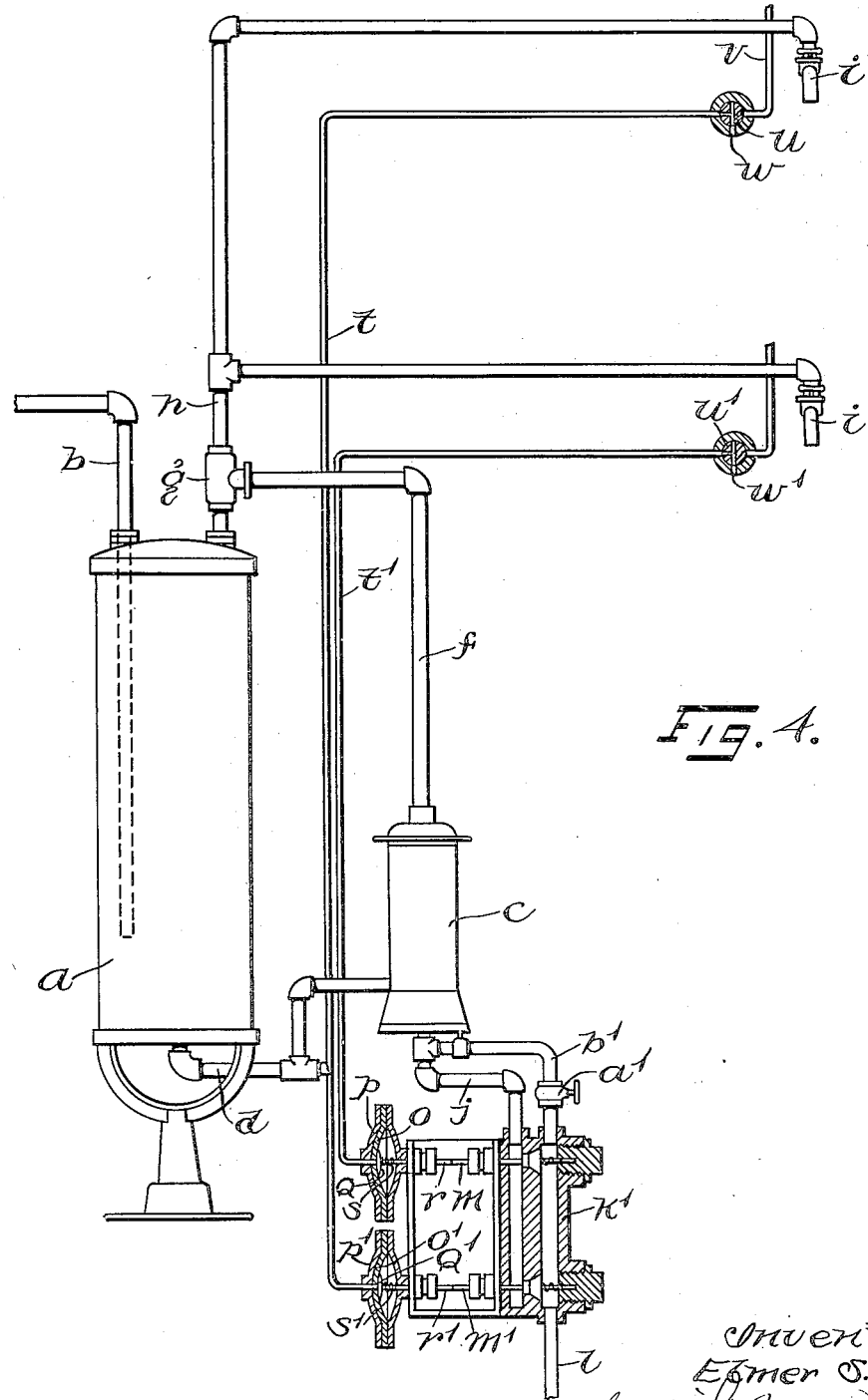
Fig. 4 is a diagrammatic elevation and partial section similar to Fig. 1, illustrating a modification of the invention by which two or more distant controllers are each able to regulate the heater.

Referring to the drawings, $a$ represents a hot water tank to which cold water is supplied by a pipe $b$ passing through the top and nearly to the bottom of the tank, as shown in dotted lines. $c$ is a heater to which water flows from the bottom of tank $a$ through a pipe $d$. The cold water enters the bottom of the heater and the hot water passes from the top through a pipe $f$ which is connected by a coupling $g$ with the hot water uptake pipe $h$ from the tank, by which the hot water taps of the water system are supplied. A tap $i$ represents one of the hot water taps and may be considered as typical of any number, whether for wash bowls, bath tubs, laundries or sinks, or for other fixtures is immaterial.

The heating flame for the heater $c$ is supplied by a burner, which is fed by a gas pipe $j$ leading from a valve casing $k$, which is fed by a supply pipe $l$ and in which there is a valve. Such valve has a stem $m$ projecting from one end of the casing $k$ and adapted to be moved endwise. When moved in the direction of the arrow in Fig. 1, the stem $m$ opens the valve. Any sort of automatic means, such as a spring or anything else, may be provided for closing the valve and normally holding it closed.

An actuator for opening the valve is indicated in Fig. 1 as a diaphragm $o$ contained in a diaphragm chamber $p$ and arranged to act on a head $q$, which is connected with a stem $r$ in line with the stem $m$. A spring $s$ holds the head $q$ against the diaphragm and tends to retain both the stem and the diaphragm in the position shown in Fig. 1. A tube $t$, which would ordinarily be very small as compared with the pipes $b$, $f$ and $h$ of the system, and may be comparable even to a capillary tube, leads into the diaphragm chamber at the side of the diaphragm $o$ opposite to that against which the spring $s$ acts. The tube $t$ leads from a controller $u$, which, in the embodiment shown in Fig. 1, is a three-way cock adapted to admit water to the tube $t$ and to permit discharge of the water therefrom when required. When the three-way cock is in the position shown in Fig. 1, it admits water under pressure from the pipe $v$, which may receive its supply from any convenient source, for instance, the pipe which supplies the cold water tap, which is ordinarily provided beside the hot water tap in any of the ordinary plumbing systems. When the three-way cock is turned a quarter turn in the direction of the arrow shown beside the dotted valve handle in Fig. 1, the valve is placed so that it uncovers an exhaust opening $w$ and permits enough of the water confined in the tube $t$ to escape, to permit return of the diaphragm to the position shown in Fig. 1, and return of the gas valve to closed position, by the action of a valve-closing spring in the valve casing $k$; such spring being sufficiently powerful to displace the water in the diaphragm chamber, and tube, and being preferably adjustable as to tension.

An alternative form of controller is shown in Fig. 2. This comprises essentially a collapsible container $u^2$ which is in communication with the tube $t$ and is supported in a guide $x$. The manually operated part of the controller is a cam lever $y$ pivoted at $y^1$ to the guide $x$, and having a cam finger $y^2$ adapted to bear on the collapsible container, either directly, as shown in Fig. 2, or through the medium of a stiff spring $y^3$, as particularly shown in Fig. 6, and indicated in Fig. 5, which is so arranged and constructed that it may yield throughout the full range of movement given by the cam finger $y^2$ without harming the collapsible container in case the latter should be incapable of being compressed for any reason When the controller $u^2$ is used in place of the controller $u$, there is no need for connecting the tube $t$ with a supply of water under pressure, because the system is then closed and the force supplied by the cam lever $y$ to the collapsible tank gives all the pressure necessary.

It will be understood that both the three-way cock $u$ and the collapsible container $u^2$, with its lever $y$ are controllers, through the proper manipulation of which pressure may be caused to act through the tube $t$ upon the diaphragm $o$. The tube $t$ is a pressure transmitting means, which is capable of being run from any part of a building to any other part, up and down from one level to another and around corners and bends. As the pressures transmitted are practically static, the actual body of water moving in the tube and the extent of movement being very slight, the transmitting means or medium is practically frictionless and is able to transmit pressures perfectly and without loss of power from any point in the building to any other point, no matter how wide apart these points may be or how many bends and angles there may be in the tube. The water under pressure admitted through the three-way cock, and the water placed under compression by manipulation of the control lever $y$, equally have the effect of displacing the diaphragm $o$, causing the diaphragm stem $r$ to abut against the gas valve stem $m$ and opening the gas valve. Thereby one desiring hot water may turn on the gas at the heater by simply manipulating the three-way cock or the compression lever $y$ without leaving the place where the water is desired, and particularly without being obliged to go to the kitchen, laundry, cellar or other more or less distant point where the heater may be located. When the three-way cock is turned to the normal position, the supply from the pipe $v$ is cut off and enough water in the transmission pipe is permitted to escape through the exhaust $w$ to allow the diaphragm and gas valve to return to their normal positions in which the gas supply to the heater is shut down or shut off. The same result is secured by returning the cam lever $y$ of Fig. 2 to the normal position, whereupon the pressure of spring $s$ causes the water in the diaphragm chamber to be forced into the tube and an equal amount to be displaced from the tube into the collapsible tank $u^2$.

This controlling device is adapted to be used with any tank heater or with a heater not connected with any tank. When the controller is operated to obtain hot water in case the supply in the tank $a$ is cold, it is not necessary to wait until the entire body of water in the tank becomes heated, because there is a direct flow from the heater to the pipe $h$ and thence to the tap as soon as the tap is opened. While the tap remains closed there is a circulation between the heater and tank by which the water in the tank is gradually heated. As many remote controlling devices may be used with one heater as desired. Thus, in a dwelling there may be one in each bath room and one in the laundry. For a multiplication of the controlling devices, it is merely necessary either to provide a number of valves $k$ with their diaphragms $o$, all connected in parallel between the pipe $l$ and the burner as shown in Fig. 4, where the same reference characters, modified by the exponent "1," are employed to show duplications of the parts represented in Fig. 1; or where the alternative controller shown in Fig. 2 is used, only one valve and one diaphragm need be used, and all the controllers may communicate with the same diaphragm chamber, as shown in Fig. 5. The remote control device may be used in connection with a direct control near the heater by providing a direct control valve $a^1$ in a by-pass pipe $b^1$ which runs from that part of the valve chamber $k$ into which the pipe $l$ opens, to the burner. The valve $a^1$ may be regulated according to the ordinary needs, and then if more water is called for than can be sufficiently heated by the flame under this regulation, a hotter flame may be produced by opening the diaphragm controlled valve for as long a time as necessary, after which, when this valve is again closed, the burner is again brought under the control of the valve $a^1$.

What I claim and desire to secure by Letters Patent is:—

1. In a water heating system the combination with a water heater, delivery pipes in connection with said heater and having outlets at separated points, manually operable pressure applying control means adjacent to each of said points, a gas burner for furnishing heat at the heater, fluid containing pressure transmitting means leading from each of said control means to the gas burner, and means adjacent to the burner operable by pressure delivered through said transmitting means for admitting gas to the burner in response to pressure originating at either of said control means.

2. In a water heating system the combination with delivery pipes having discharge outlets at separated points and a heater for supplying hot water to said delivery pipes, a controller adjacent to each of said discharge points, means adjacent to the heater for governing the amount of heat furnished thereby to the water, and fluid conducting means leading from each of said controllers to said governing means containing fluid which is adapted to be put under pressure by operation of said controllers, and said governing means being constructed to increase the amount of heat developed at the heater, whereby said heater may be operated by manipulation of either of said controllers.

3. In a hot water supplying system, the combination with a water heater and a plurality of discharge taps located at different points and in connection with said heater, of heat regulating means adjacent to the heater for governing the amount of heat furnished to the water therein, conducting means containing fluid in communication with said regulating means and leading thence into proximity to each of said taps, a controller adjacent to each tap constructed and arranged to produce and intermit pressure upon the fluid in the latter, whereby either of said controllers is adapted to put the heater in and out of operation.

4. In combination with a water heater having a gas burner, a valve for governing the supply of gas to the burner, a fluid operated actuator for said valve, a conduit containing pressure transmitting fluid leading from said actuator and having terminals at separated points, and a manually operated controller in connection with each of said terminals adapted to apply and intermit pressure to the transmission fluid, whereby either of said controllers is adapted to operate the said valve.

5. In combination with a water heater having a gas burner, a valve for governing a supply of gas to the burner, a fluid operated actuator for said valve, a conduit containing pressure transmitting fluid leading from said actuator and having terminals at separated points, and a manually operated controller in connection with each of said terminals adapted to apply and intermit pressure to the transmission fluid, whereby either of said controllers is adapted to operate the said valve, each of said controllers having a yielding pressure applying medium sufficiently powerful to apply the pressure needed to operate the valve but adapted to yield to prevent application of excessive pressure to the fluid.

6. A valve controlling apparatus comprising in combination with a valve, a pressure actuated member associated with said valve so as to control the position of the same, a conduit leading from said member and containing a pressure transmitting fluid, said conduit having a plurality of distinct terminals, and a fluid container connected with each terminal and equipped with means for applying pressure to the fluid therein, whereby either container may be caused to actuate the valve.

7. A valve controlling apparatus comprising in combination a valve, a chamber adapted to contain pressure transmitting fluid and having a movable wall, means for transmitting movements of said wall to the valve, elongated conducting means containing pressure transmitting fluid extending from said chamber and having separate terminals, a collapsible fluid container connected to each terminal, and pressure applying means connected with each container for collapsing the same, whereby to produce and transmit pressure in the fluid to the chamber, said pressure transmitting means including a yielding element having sufficient stiffness to apply the required pressure, but being sufficiently yielding to avoid injury to the apparatus in case pressure should be applied to more than one container at the same time.

8. A controller for a valve operating apparatus consisting of a collapsible container in which is confined a quantity of relatively incompressible fluid, a pipe leading from said container, a pressure applying member and a spring interposed between said member and said container, arranged to transmit pressure from the member to the container and being sufficiently powerful to cause collapsing of the container.

9. A controller for a valve operating apparatus consisting of a container having a portion thereof so movable as to vary the internal volume of the container, a pressure applying member for so moving said movable portion, and a yielding device interposed between said pressure applying member and said movable portion for transmitting the force applied by said member and for limiting such force by its capability of yielding to a predetermined amount.

10. The combination with a water heater and means for governing the amount of heat furnished thereby, of a plurality of remote controllers for said governing means, each of said controllers comprising a vessel containing pressure transmitting fluid and having a movable wall, conducting means in communication with said chambers leading therefrom to said governing means and filled with fluid, either of said controllers being operable to transmit operating pressure to said governor and means for absorbing the excess pressure caused by the operation of two of said controllers at the same time.

In testimony whereof I have affixed my signature, in presence of two witnesses.

ELMER S. STACK.

Witnesses:
ARTHUR H. BROWN,
MARY A. HINES.